United States Patent [19]

McNickle

[11] Patent Number: 5,503,407
[45] Date of Patent: Apr. 2, 1996

[54] WINDBACKS FOR ROTATING SHAFTS

[75] Inventor: Alan D. McNickle, Sellersville, Pa.

[73] Assignee: Stein Seal Company, Kulpsville, Pa.

[21] Appl. No.: 229,172

[22] Filed: Apr. 18, 1994

[51] Int. Cl.⁶ .................................................. F16J 15/16
[52] U.S. Cl. ........................... 277/134; 277/29; 277/192
[58] Field of Search ............................ 277/29, 134, 53, 277/55, 56, 57, 192, 157, 197

[56] References Cited

U.S. PATENT DOCUMENTS

| | | | |
|---|---|---|---|
| 1,493,598 | 5/1924 | Buckwalter | 277/134 |
| 3,532,399 | 10/1970 | Gray | 277/53 |
| 3,617,068 | 11/1971 | Sprenger | 277/134 |
| 3,843,140 | 10/1974 | Mayer et al. | 277/134 |
| 3,937,477 | 2/1976 | Gyory | 277/134 |
| 4,082,296 | 4/1978 | Stein | 277/133 |

FOREIGN PATENT DOCUMENTS

| | | | |
|---|---|---|---|
| 0158134 | 3/1957 | Sweden | 277/134 |

OTHER PUBLICATIONS

Stein Seal Co. Catalog, entitled "Shaft Seals" p. 10 Author and date unavailable.

*Primary Examiner*—Daniel G. DePumpo
*Attorney, Agent, or Firm*—Zigmund L. Dermer

[57] ABSTRACT

An annular windback is provided in a housing containing a lubricant sump and a rotating shaft therein. The windback is located at one end of the sump and the shaft extends through the windback. The housing has a seal interacting between the housing and the shaft to prevent lubricant from exiting the sump and to prevent other media within the housing from entering the sump. The windback is located between the seal and the one end of the sump and has a spiral groove in the inner annular surface facing the shaft for providing a return path for lubricant carried toward the seal by shaft windage. One or more radial holes are formed in the windback at an axial location thereon between the seal and the closer end of the spiral groove to equalize the pressure at the aforesaid axial location between the windback and the shaft with the pressure in the remainder of the sump.

5 Claims, 1 Drawing Sheet

WINDBACKS FOR ROTATING SHAFTS

BACKGROUND OF THE INVENTION

The present invention is directed to windback devices, employed with a rotating shaft and positioned between a lubrication sump and a shaft seal for the sump, and comprises an improved windback for preventing a lubrication fluid from reaching the seal.

With rotating shafts, lubrication sumps are frequently required along segments thereof to provide lubrication for shaft bearings and the like. It is frequently desirable to isolate the lubrication sump from the remaining media in which the shaft is immersed as well as to ensure that the lubricant remains in the sump so that (1) the lubrication of the bearings may continue and (2) the lubricant does not contaminate the other media in which the shaft is immersed. For example, in gas turbine applications, the lubrication sump is isolated from the remainder of the gas turbine housing by the shaft seal and the remainder of the housing is filled with high temperature, high pressure gases at temperatures and pressures higher than those desired in the lubrication sump. It is important to prevent lubricant from mixing with the high temperature gases which when an oil lubricant is used, could form oil coke, a byproduct of oil heated to an elevated temperature which chemically alters the oil and is detrimental to the gas turbine. Oil coke could foul seal surfaces and prevent proper bearing lubrication.

To accomplish such isolation, a shaft seal is normally provided adjacent the sump to retain the lubricant therewithin. However, for rotating shafts, the shaft windage tends to move the lubricant along the shaft out of the sump (termed "lubricant splash") which could result in the loss of lubricant. Sealing means including a shaft seal are normally provided to prevent lubricant loss. The shaft seal, which may comprise a segmented carbon rubbing seal, may have the carbon sealing faces contaminated by the lubricant should the same reach the seal. In order to prevent the lubricant splash from reaching the seal carbons or the like, a windback device is interposed along the shaft between the seal and the lubrication sump. The windback device normally comprises an annular collar-like member receiving the shaft in the opening thereof and having a screw pitch or thread in the surface thereof facing the shaft. The windback device is secured to the housing to prevent leakage from the sump to the remainder of the housing except along the shaft, and the shaft seal is interposed between the windback device and the shaft on the side of the windback device remote from the sump to prevent lubricant leakage along the shaft.

Since the windback device is in close proximity to the shaft yet not so close as to expect to create a pressure drop therealong, it would be expected that the pressure along the opening in the windback device, i.e., at positions adjacent the rotating shaft, would be essentially the same so that any oil splash moving along the shaft of the windback device would be encouraged to flow back toward the sump along the threaded inner surface of the windback collar. A number of pressure measurements along the axial length of the windback device were performed with the surprising result that a pressure drop actually existed between the sump and the end of the windback device remote from the sump. The pressure at the sump end of the windback opening was greater than the pressure at the seal end of the windback opening. Thus, lubricant would be encouraged by this pressure drop to move in the direction away from the sump along the shaft to other interior portions of the shaft housing because of the pressure drop along the windback in that direction. In applications such as gas turbines, the pressure of the housing medium in regions other than in the sump is higher than the pressure within the sump. Thus, one would expect that the pressure in the sump adjacent the seal would be higher than the pressure in the remainder of the sump. These experiments showed that, even in such applications, the pressure in the sump adjacent the seal was lower than the pressure in the remainder of the sump, thus incurring additional lubricant flow toward the seal.

By virtue of this discovery, this invention proposes to modify the windback device to eliminate any such pressure drop along it, and thereby reducing the possibility of lubricant leakage along the shaft out of the sump through the seal, thus ensuring the return to the sump of lubricant caused by shaft rotational splash.

SUMMARY OF THE INVENTION

This invention provides for a windback device for use with a rotating shaft disposed in a housing which contains a lubricant sump and provides for means to ensure the return to the sump of lubricant moving along the shaft away from the sump.

DETAILED DESCRIPTION

Figure 1:
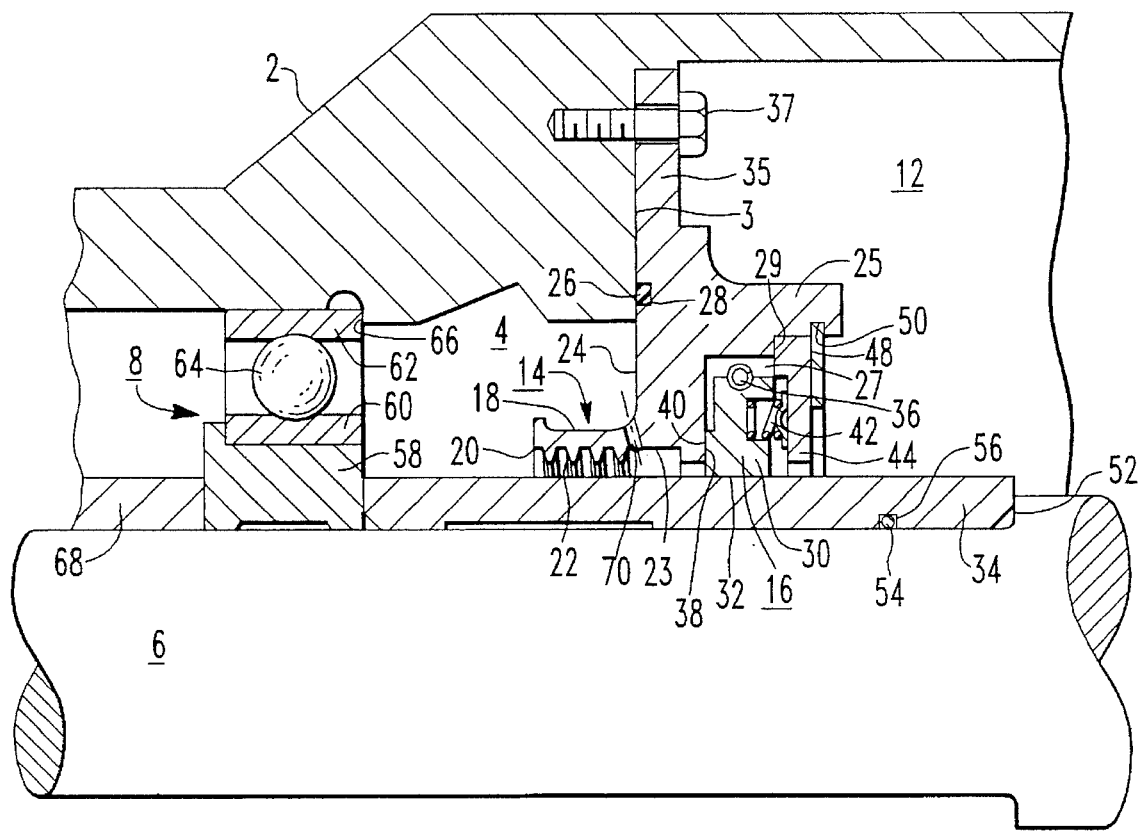
FIG. 1 is a view in vertical section of the windback device constructed in accordance with this invention disposed between a lubricant sump located within a housing containing a rotating shaft and a sealing means for isolating the medium within the lubricant sump from the remainder of the interior of the housing.

As shown in FIG. 1, a housing 2 of annular configuration is provided with a necked-down portion and an internal shoulder 3 which cooperate to form a chamber or lubricant sump 4 therein adapted to contain a lubricating fluid. A shaft 6 passes through housing 2 and chamber 4. The shaft 6 has mounted thereon a portion of bearing assembly 8 which interacts between rotating shaft 6 and stationary housing 2, as will be described. Bearing assembly 8 includes antifrictional means which is lubricated by a lubricant disposed within chamber 4. Housing 2 extends past shoulder 3 and forms another interior chamber 12 to the right of chamber 4 and through which shaft 6 also extends. Interposed between chambers 4 and 12 is a windback device 14 which in this example has mounted thereon a shaft seal assembly 16.

The purpose of the seal assembly 16 and windback device 14 is to ensure isolation of the media in chambers 4 and 12 within the housing. It is important that the lubricant located in chamber 4 not extend into chamber 12 in certain applications. In other applications, the pressure in chamber 12 may be lower than the pressure in chamber 4 so that lubricant flow from chamber 4 to chamber 12 may occur. Even if the pressure in chamber 12 is substantially higher than that in chamber 4, shaft windage could cause lubricant splash toward chamber 12. The windback 14 and seal assembly 16 serve to prevent such interaction.

Figure 2:
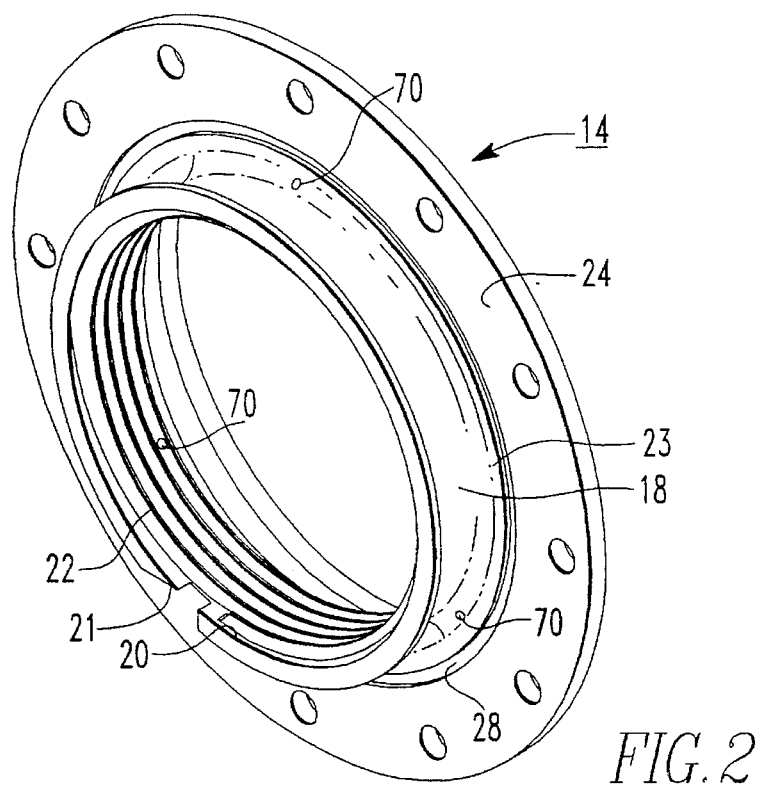
FIG. 2 is a perspective view of the windback device of FIG. 1.

In this example, windback assembly 14 includes an annular collar 18 which receives the shaft 6 in the opening thereof and surrounds shaft 6 with abundant clearance. The inner face 20 of collar 18 which faces shaft 6 is provided with a spiral thread thereon indicated by the reference character 22, which assists lubricant to flow back into chamber 4. At the sump end of the windback thread 22, there is provided a radially extending leak off slot 21 (FIG. 2) in the thread 22 which assists in directing the lubricant as it leaves the thread 22 back to the sump. At the end 23 of collar 18, which is remote from bearing assembly 8, there is provided a flange 24 on windback assembly 14 which is adapted to be clamped to internal shoulder 3 of housing 2. A recess complementary in shape to flange 24 is formed integrally in housing 2 at shoulder 3 and receives flange 24 therein. A sealing means such as an O-ring 26 is located in an O-ring groove 28 formed on flange 24 and engages shoulder 3 and flange 24 to prevent leakage from chamber 4 through the space between flange 24 and housing segment 2. A seal is effected by the use of a plurality of bolts 34 which clamp flange 24 to shoulder 3 with O-ring 26 interacting therebetween to separate sump 4 from chamber 12, except along shaft 6.

In this example of this invention, a seal assembly 16 is accommodated by the windback assembly 14 to complete isolation of chamber 12 and sump 4. More particularly, windback assembly 14 includes an annular projection 25 extending axially outwardly from flange 35 and surrounding shaft 6. Projection 24 extends from the side of windback assembly 14 opposite to collar 18 with projection 25 being of a larger diameter than collar 18. Formed inwardly of the annular projection 25 is a stepped seal-receiving cavity 27 in which the seal assembly 16 is located. Cavity 27 has a radially extending seal retention shoulder 29 therein and located approximately midway in the axial direction along cavity 27 so that shoulder 29 faces chamber 12. The seal assembly 16 may comprise a plurality of segmented seal rings 30, for example, of a segmented carbon seal ring design such as the assembly illustrated in FIGS. 1 through 4 of U.S. Pat. No. 4,082,296, issued Apr. 4, 1978, of Dr. P. C. Stein and assigned to the same assignee as this invention. Thus, the seal assembly need not be described in detail herein; however, it is clear that seal assembly 16 may comprise a plurality of segments formed from carbon or carbon-graphite such as segment 30 (only one of which is shown in FIG. 1) which has a sealing bore surface 32 thereon which seals against a sealing surface on a shaft sleeve 34, to be described. Means such as a coil spring 36 serves to mechanically urge the carbon seal segments 30 against the sealing surface on the shaft sleeve 34. In addition, a secondary seal is formed in the radial direction between complementary radially extending surfaces on windback assembly 14 and seal ring segments 30. Thus, the radially extending surface on the innermost end of cavity 27 of windback assembly 14 which surface is designated by the reference character 38 is a transverse sealing face and is formed to be of sufficient smoothness as to prevent leakage therealong as it coacts with a complementary surface 40 extending radially on each segment 30 of the seal assembly 16. Sealing between transverse sealing surfaces 38 and 40 is further effected by a plurality of spring means, one of which is coil spring 42, which mechanically urge seal segments 30 against surface 38 to ensure adequate sealing. A seal support ring 44 is positioned axially to the right of seal ring segments 30 and is fixed in position by shoulder 29 in cavity 27 and is fixedly located in that position by a retaining ring 48, desirably a split retaining ring, which is received within a recess 50 located in the inwardly facing surface of projection 25 of windback assembly 14.

As previously noted, in this example, shaft 6 has located thereon a shaft sleeve 34 which abuts against a shoulder 52 formed on the shaft to prevent movement of sleeve 34 relative to the shaft 6. A sealing device such as an O-ring 54 located in a recess 56 in sleeve 34 is provided to interact between sleeve 34 and shaft 6 to prevent leakage along a path between them. The left end of shaft sleeve 34 is engaged by an annular race support 58 which is mounted on shaft 6 to position bearing assembly 8 between shaft 6 and housing 2. More particularly, bearing assembly 8 includes, in this example, inner and outer races 60 and 62 which support and interact with anti-frictional means such as balls 64 in a conventional ball-bearing arrangement. Outer race 62 engages a housing shoulder 66 positioned to face inwardly on housing 2 to locate the race 62. An additional shaft sleeve 68 is carried by shaft 6 to position race support 58 and sleeve 34 in a fixed manner on shaft 6 so that sleeve 34 is in engagement with shoulder 52. Locking means, not shown, are interposed between shaft sleeve 68 and the shaft in order to prevent relative movement of sleeves 34 and 68 and race support 58 relative to shaft 6. It should be noted that the mounting of bearing assembly 8 does not form a part of this invention and that other bearing and mounting arrangements, such as a bearing mounted directly on the shaft 6, may be employed.

It can, therefore, be seen that shaft 6 is rotatable within housing 2 and seal assembly 16 by virtue of one or more bearing assemblies such as bearing assembly 8, with bearing assembly 8 being located in a lubricant sump or chamber 4 which may receive an appropriate lubricant, to provide reduced friction and long life therefor. Lubricants, in many examples, comprise liquids such as oil which serve to maintain the bearings, but which should be retained within the sump 4 of the housing 2. In furtherance of this purpose, seal assembly 8 is mounted in this example on windback assembly 14 to prevent the passage of lubricant along the shaft 6 into the remainder of the housing interior 12. It has been found, however, that during rotation of a shaft such as shaft 6, the shaft windage serves in certain circumstances to move the liquid lubricant along the shaft toward the seal assembly 16. It is important to keep the lubricant splash from reaching the seal, particularly if it has carbon seal ring(s), since lubricants such as oil could well damage the sealing ability of a carbon seal. The windback assembly 14 normally serves that purpose in that the oil splash is encouraged to return to sump 4 along the threaded inner region 22 of the windback assembly 14.

Since oil or other lubricant is returned to the sump via the windback thread 22, this "screw" action is enhanced by employing either a right hand or a left hand thread 22 depending upon the direction of rotation of the shaft 6. The pitch hand of the thread 22 is selected so that the shaft windage would have a tendency to push the lubricant droplets in the thread 22 of the windback and direct oil away from the seal. Thus, for a shaft rotating clockwise, the pitch hand of the thread (in the direction from the sump toward the seal) would be a right hand thread in the axial direction toward the seal assembly 16, thus pushing droplets of lubricant toward lubricant sump 4. For counterclockwise rotation of the shaft 6, the pitch hand of thread 22 would be the opposite to achieve this result.

Frequently, the housing interior region 12 is at a higher pressure than the pressure in the sump region 4 and it would be assumed that such pressure difference should discourage oil splash from moving toward the seal assembly 16. It would normally be expected that, in examples where the interior pressure of chamber 12 is higher than the pressure within the sump, the pressure along the windback thread 22 closer to housing chamber 12 would be higher than the pressure in sump 4 remote from region 12. Surprisingly, however, as a result of a number of measurements of oil pressure along thread 22, it was discovered that the pressure along the thread 22 adjacent end 20 (i.e., closer to bearing assembly 8) was higher than the pressure of the threads at the end closer to seal assembly 16. Thus, the pressure difference along thread 22 encourages lubricant to move toward the seal assembly thereby increasing the possibility of fouling the seal.

The purpose of this invention is to minimize the likelihood of such an occurrence by ensuring that the pressure along the windback threads closer to seal assembly 16 is no less than the pressure in the remainder of sump 4. To achieve this result, one or more radial openings 70 have been made through windback assembly 14 at a position between the flange assembly 24 and the adjacent end of the thread 22. With the provision of opening(s) 70, the pressure in the remainder of sump 4 is maintained at the same level as the pressure between shaft 6 and thread 22 adjacent the seal assembly 16, thus preventing any increase in the magnitude of the oil splash carried by the shaft toward seal assembly 16 which would have been created by the existence of a lower pressure along thread 22 adjacent seal assembly 16. With the pressure equalization means of this invention, the windback assembly 14 is able to accomplish its purpose more effectively for all applications. It should be noted that in this example, the windback assembly 14 is received directly within the seal assembly 16. While this constitutes a convenient arrangement, the present invention is effective with seal assemblies which are located entirely separate from the windback assembly 14.

It will be understood, therefore, that the above-discussed embodiment is illustrative of this invention and is not intended to be limiting thereof.

I claim:

1. A windback means for use with a rotating shaft which has a portion thereof adapted to be disposed in a lubricant containing sump, said windback means comprising an elongated annular member having axially spaced ends and an inner and an outer surface and adapted to receive the shaft therein, said annular member having a flange having two sides with one side of said flange extending radially outwardly from one end of said annular member, said flange having openings for accommodating securing means so that said flange may be secured to a non-moving member such as a housing, which is adapted to receive the shaft and the lubricant-containing sump therein, the other end of said annular member adapted to be positioned closer to said lubricant-containing sump than said one end, the inner surface of said annular member which faces the shaft when assembled therewith, having a spirally extending thread formed therein extending from said other end of said annular member and terminating short of said flange to provide a return path for any lubricant that has been moved by rotation of said shaft from said other end toward said one end of said annular member, and the improvement wherein said annular member has at least one radial opening therein axially located between the terminus of said thread and said flange and extending from said inner surface entirely through said annular member to said outer surface thereof, to increase the pressure on the inner side of said annular member to the pressure level on the outside of the annular member thereby to prevent lubricant from moving along the thread beyond the opening in the direction of said flange and a segmented seal mounted on said flange and positioned to prevent flow along said shaft, said seal being mounted on said flange adjacent said one end of said annular member whereby said opening prevents lubricant from fouling said seal segments.

2. The windback means of claim 1 wherein said at least one opening comprises a plurality of spaced radial openings circumferentially spaced on said annular member with each opening being at an axial location along said annular member between said flange and the terminus of said thread.

3. The windback means of claim 1 wherein said one opening is one of a plurality of openings spaced equidistantly about the circumference of said annular member at said axial position.

4. In combination, a rotating machine having an elongated annular housing and an elongated shaft mounted for rotation therein, said housing having two adjacent interior chambers therein and having said shaft extending into each of said chambers and rotatable therein, one of said chambers comprising a lubricant-containing sump and the other chamber containing a gaseous medium, said shaft when rotated causing lubricant to move axially along the shaft from said sump toward said other chamber, means for arresting and returning said lubricant flow back to said sump, comprising:

a windback means located in said sump having an elongated annular section forming inner and outer annular surfaces and axially spaced ends, said annular section receiving said shaft adjacent the inner surface thereof at an axial location along said shaft within said sump and adjacent said other housing chamber, the outer surface of said annular section being spaced from said housing and being exposed to the same pressure as the pressure in said sump, said annular section having a flange formed thereon extending radially outwardly from the one end thereof located closer to said other chamber, means fixedly and sealingly mounting said flange to said housing to prevent lubricant from exiting said sump into said other housing chamber along said flange, said inner surface of said annular section having a spiral thread formed therein starting at the other end thereof and extending toward yet terminating short of said one end thereof to form a return path for lubricant carried along said shaft toward said other chamber by the rotation of said shaft, said flange having one of its sides exposed to said other chamber and separating said one chamber from said other chamber except for the annular space between said shaft and the inner surface of said annular section, sealing means mounted on said shaft for sealing said annular space located adjacent said one side of said flange to isolate said chambers from each other, said sealing means comprising a segmented seal ring surrounding said shaft, means biasing each of said seal ring segments into sealing engagement with said shaft, said sealing means including a secondary sealing surface on each of said segments facing a portion of said one side of said flange, means biasing said secondary sealing surface on each of said segments into sealing engagement with said portion of said one side of said flange to form a secondary seal, and said annular segment having at least one radial opening extending therethrough and axially located on said segment between the terminus of said thread and said flange to accommodate lubricant flow from said sump through said opening to said thread terminus and along said thread to increase the pressure on the inner surface of the annular portion to the same pressure as that on the outer surface thereof, thereby to prevent lubricant from said sump from moving along said shaft beyond said radial opening toward said sealing means and into said other chamber to avoid the possibility of fouling the seal ring segments by lubricant.

5. The machine of claim 4 wherein said at least one radial opening comprises a plurality of circumferentially spaced radial openings which are at essentially the same axial location on said annular member.

* * * * *